(12) United States Patent
Nanda et al.

(10) Patent No.: US 11,010,082 B2
(45) Date of Patent: May 18, 2021

(54) MECHANISMS FOR PERFORMING ACCURATE SPACE ACCOUNTING FOR VOLUME FAMILIES

(71) Applicant: EMC IP Holding Company LLC, Hopkinton, MA (US)

(72) Inventors: Kumari Bijayalaxmi Nanda, Edison, NJ (US); Michal Marko, Fanwood, NJ (US); Soumyadeep Sen, Highland Park, NJ (US); Alexander S. Mathews, Morganville, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 34 days.

(21) Appl. No.: 16/176,497

(22) Filed: Oct. 31, 2018

(65) Prior Publication Data
US 2020/0133555 A1  Apr. 30, 2020

(51) Int. Cl.
*G06F 3/06* (2006.01)

(52) U.S. Cl.
CPC .......... *G06F 3/0647* (2013.01); *G06F 3/0604* (2013.01); *G06F 3/0673* (2013.01)

(58) Field of Classification Search
CPC ..... G06F 3/0647; G06F 3/0604; G06F 3/0673
See application file for complete search history.

(56) References Cited

U.S. PATENT DOCUMENTS

| | | | |
|---|---|---|---|
| 8,027,984 B2 | 9/2011 | Passey et al. | |
| 8,688,935 B1 * | 4/2014 | Yochai | G06F 3/0608 711/162 |
| 8,700,578 B1 * | 4/2014 | Varadan | G06F 16/174 707/692 |
| 8,996,490 B1 | 3/2015 | Armangau et al. | |
| 9,009,429 B2 * | 4/2015 | Kapanipathi | G06F 3/0608 711/162 |
| 9,449,011 B1 * | 9/2016 | Chen | G06F 16/1748 |
| 9,557,933 B1 | 1/2017 | Burke et al. | |
| 9,753,932 B1 * | 9/2017 | Brow | G06F 16/113 |
| 9,760,574 B1 | 9/2017 | Zhai et al. | |
| 9,845,544 B2 | 12/2017 | Floner et al. | |
| 9,875,043 B1 | 1/2018 | Suldhal | |
| 9,898,224 B1 | 2/2018 | Marshak et al. | |
| 9,904,480 B1 | 2/2018 | Singh et al. | |
| 9,916,102 B1 | 3/2018 | Bassov et al. | |

(Continued)

*Primary Examiner* — Adam M Queler
*Assistant Examiner* — Richard L Sutton
(74) *Attorney, Agent, or Firm* — BainwoodHuang

(57) ABSTRACT

Techniques for performing space accounting for volume families. The techniques include maintaining two counters for each volume family, including a first counter that tracks a first amount of physical space allocated to volumes in the volume family based on the number of pages written to the volumes, and a second counter that tracks a second amount of physical space owned by the volume family, and maintaining a third counter for each volume in each branch of the volume family that tracks a number of pages among a total number of pages written to the volume that were overwritten in the immediate sequential next volume in the same branch as the volume. By maintaining, for each volume family, the first counter and the second counter, and, for each volume in the volume family, the third counter, space accounting metrics can be obtained that allow data storage activities to be performed efficiently.

20 Claims, 8 Drawing Sheets

(56) References Cited

U.S. PATENT DOCUMENTS

| | | |
|---|---|---|
| 9,940,331 B1 | 4/2018 | Bono et al. |
| 9,959,054 B1 | 5/2018 | Vankamamidi et al. |
| 10,061,697 B2 | 8/2018 | Danilov et al. |
| 10,073,969 B1 | 9/2018 | Faibish et al. |
| 10,474,363 B1* | 11/2019 | Cui .................. G06F 3/0653 |
| 10,732,840 B2* | 8/2020 | Nanda .................. G06F 3/0653 |
| 2006/0230243 A1* | 10/2006 | Cochran ............ G06F 11/1451 |
| | | 711/162 |
| 2006/0271604 A1* | 11/2006 | Shoens .................. G06F 16/128 |
| 2008/0256311 A1* | 10/2008 | Lee .................. G06F 3/0605 |
| | | 711/162 |
| 2010/0281081 A1* | 11/2010 | Stager .................. G06F 9/5022 |
| | | 707/814 |
| 2011/0258404 A1* | 10/2011 | Arakawa .............. G06F 3/0608 |
| | | 711/162 |
| 2011/0320707 A1* | 12/2011 | Usami .................... G06F 3/065 |
| | | 711/114 |
| 2012/0011336 A1* | 1/2012 | Saika .................. G06F 3/0604 |
| | | 711/162 |
| 2013/0159648 A1* | 6/2013 | Anglin ................ G06F 11/1453 |
| | | 711/162 |
| 2013/0305022 A1* | 11/2013 | Eisen .................. G06F 9/30087 |
| | | 712/214 |
| 2014/0114933 A1* | 4/2014 | Chandrasekarasastry .................. |
| | | G06F 3/06 |
| | | 707/692 |
| 2014/0156601 A1* | 6/2014 | Strunk .................. G06F 3/0619 |
| | | 707/639 |
| 2014/0156956 A1* | 6/2014 | Ezra ...................... G06F 3/065 |
| | | 711/162 |
| 2014/0208048 A1* | 7/2014 | Deguchi ............ G06F 11/2074 |
| | | 711/162 |
| 2014/0358873 A1* | 12/2014 | Daga .................... G06F 16/215 |
| | | 707/692 |
| 2015/0046668 A1* | 2/2015 | Hyde, II ............... G06F 3/0689 |
| | | 711/162 |
| 2016/0034489 A1* | 2/2016 | Lewis .................. G06F 3/0608 |
| | | 707/692 |
| 2017/0308305 A1* | 10/2017 | Goel .................... G06F 3/0641 |
| 2017/0315878 A1* | 11/2017 | Purohit .................. G06F 3/067 |

* cited by examiner

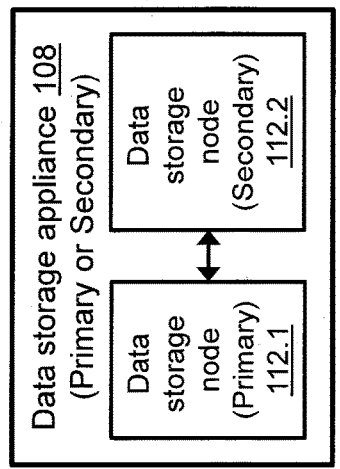
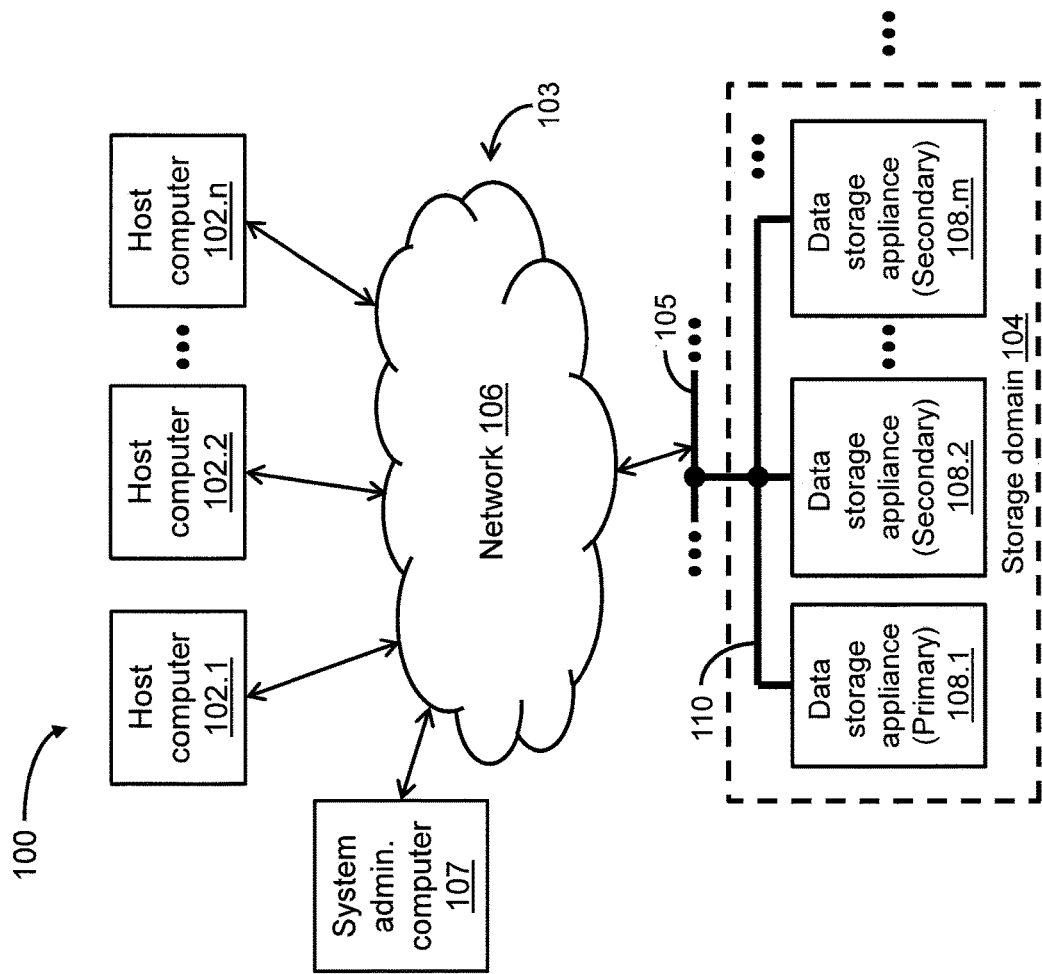
Fig. 1a
Fig. 1b

MECHANISMS FOR PERFORMING ACCURATE SPACE ACCOUNTING FOR VOLUME FAMILIES

BACKGROUND

Data storage systems include storage processors coupled to arrays of non-volatile storage devices, such as magnetic disk drives, electronic flash drives, and/or optical drives. The storage processors are configured to service storage input/output (IO) requests received from host computers, which send the storage IO requests to the data storage systems over one or more networks. The storage IO requests specify data pages, data files, data blocks, and/or other data elements to be written to, read from, created on, and/or deleted from data volumes, file systems, and/or other storage objects stored on the respective non-volatile storage devices. Computer software application programs running on the storage processors are configured to manage the received storage IO requests, and to perform various data processing tasks to organize and/or secure the data elements and/or storage objects on the non-volatile storage devices.

SUMMARY

At certain points in time, a data storage system can create one or more snapshot volumes for purposes of providing data recovery, backing-up data volumes, improving computer software application program availability, reducing data management costs, and/or other purposes. A snapshot volume can record a state of the data storage system by creating a point-in-time (PIT) copy of a data volume (e.g., a parent volume), which can be organized with associated metadata in a logical address space. The parent volume can include extents of storage space within the logical address space, and extents belonging to the parent volume can include data pages of the same size or different sizes. The data storage system can also create a sequence of snapshot volumes of the parent volume, in which one or more data pages of the snapshot volumes are shared or unshared with the parent volume and/or one or more of the other snapshot volumes in the sequence. The sequence of snapshot volumes can constitute at least part of a volume family, which can include at least one branch, each branch including one or more snapshot volumes that are sequential copies of the parent volume.

For data protection or data mobility purposes, a data storage system can perform data migration tasks involving one or more storage volumes. Data migration typically involves the transfer of volume data and host connectivity from a source storage system to at least one volume on a destination storage system. Performing data migration tasks poses challenges, however, when the data migration involves transferring or moving data of a volume family from a source storage system to a destination storage system. For example, such source and destination storage systems may be implemented as primary and secondary storage appliances, respectively, deployed in a clustered storage environment, which can include multiple such storage appliances, some of which may be members of the same storage domain or different storage domains. These challenges can stem from, among other things, difficulties in (i) determining, before performing a migration of volume family data, whether a secondary storage appliance has enough available storage space to receive the volume family data, and/or (ii) determining, once the migration of the volume family data has completed, how much storage space has been released or recovered on the primary storage appliance.

Techniques are disclosed herein for performing space accounting for volume families in a data storage system. Each volume family can include at least one branch, and each branch can include one or more child volumes (e.g., snapshot volumes) that are sequential copies of a parent volume. The disclosed techniques can include maintaining two (2) counters for each volume family, namely, (i) a first counter that can track a first amount of physical storage space allocated to all data volumes in the volume family based on the number of data pages written to the respective data volumes, and (ii) a second counter that can track a second amount of physical storage space owned by the volume family. Such a volume family is deemed to be an owner of the amount of physical storage space allocated to data volumes in the volume family, so long as a deduplication domain for each deduplicated data page written to the data volumes consists of data segments within the volume family. The first amount of physical storage space tracked by the first counter is referred to herein as the "FamilyAddedCount," and the second amount of physical storage space tracked by the second counter is referred to herein as the "FamilyOwnedCount."

The disclosed techniques can further include maintaining, for each data volume in each branch of the volume family, a third counter that can track a number of data pages among a total number of data pages written to the data volume that were overwritten in the immediate sequential next volume in the same branch as the data volume. The number tracked by the third counter, referred to herein as the "SnapOwnedCount," can provide an indication of the number of data pages owned by a snapshot volume. Such a snapshot volume is deemed to be an owner of a data page if the snapshot volume is the data volume to which the data page was last written. Having obtained the FamilyAddedCount, the FamilyOwnedCount, and the SnapOwnedCount, several space accounting metrics can be generated, determined, or otherwise obtained from one or more of the respective counts, including (i) a "deduplication ratio" metric, (ii) a "snapshot savings" metric, (iii) a "physical storage space recovered upon deletion of a volume family" metric, and (iv) a "physical storage space required to receive a volume family" metric. By maintaining, for each volume family, a first counter and a second counter for tracking the FamilyAddedCount and the FamilyOwnedCount, respectively, and, for each data volume in the volume family, a third counter for tracking the SnapOwnedCount, several space accounting metrics can be obtained that can allow data storage activities such as data storage recovery and/or data migration, among others, to be performed more efficiently.

In certain embodiments, a method of performing space accounting for volume families in a data storage system includes (i) maintaining a first count representing a first amount of physical storage space allocated to a plurality of data volumes in a volume family based on a number of data pages written to the respective data volumes, the plurality of data volumes being stored in association with a first data storage appliance, (ii) maintaining a second count representing a second amount of physical storage space allocated to the plurality of data volumes in the volume family, the second amount of physical storage space corresponding to an amount of physical storage space owned by the volume family, and (iii) based on one or more of the first amount of physical storage space and the second amount of physical storage space, performing a migration of the plurality of data volumes in the volume family from the first data storage appliance to a second data storage appliance, the first amount of physical storage space corresponding to an amount of physical storage space required to receive the volume family at the second data storage appliance, and the second amount of physical storage space corresponding to an amount of physical storage space recovered at the first data storage appliance having performed the migration of the volume family.

In certain arrangements, the data pages include one or more deduplicated data pages, and the method further includes maintaining a deduplication domain for each deduplicated data page written to the respective data volumes, the deduplication domain consisting of data segments within the volume family.

In certain arrangements, the data pages include a deduplicated data page, the deduplicated data page includes one or more data segments that are shared among different logical addresses across the same data volume or different data volumes, and the method further includes tracking multiple logical address references to each data segment of the deduplicated data page.

In certain arrangements, the method further includes determining whether one or more of the logical address references to the data segment are from the same data volume or different data volumes of the volume family, and, having determined that one or more of the logical address references to the data segment are from the same data volume or different data volumes of the volume family, increasing the second count by an amount corresponding to a physical storage space allocated to the data segment.

In certain arrangements, the method further includes determining whether one or more of the logical address references to the data segment are from the same data volume or different data volumes of another volume family, and, having determined that one or more of the logical address references to the data segment are from the same data volume or different data volumes of the other volume family, reducing the second count by an amount corresponding to a physical storage space allocated to the data segment.

In certain arrangements, the maintaining of the first count representing the first amount of physical storage space allocated to the plurality of data volumes in the volume family includes tracking a logical size of each data volume, in which the logical size corresponds to a logical committed size of the data volume.

In certain arrangements, the volume family has an associated family identifier (ID), the family ID is referred to herein as an IO key, the volume family includes a writable volume, and the method further includes (i) receiving a write request at the first data storage appliance, the write request requesting that a data page be written to the writable volume of the volume family, (ii) incorporating the IO key into the write request, and (iii) forwarding the write request along a write path to effect writing of the data page to the writable volume of the volume family.

In certain arrangements, the method further includes maintaining the IO key in a namespace index node (inode) of the first data storage appliance.

In certain arrangements, the method further includes, having written the data page to the writable volume of the volume family, increasing the first count by an amount corresponding to a logical committed storage space allocated to the data page.

In certain arrangements, the plurality of data volumes in the volume family include one or more snapshot volumes, and the method further includes (i) performing snapshot delete processing to delete at least one of the snapshot volumes in the volume family, (ii) having performed the snapshot delete processing, determining an amount of logical committed storage space recovered from the snapshot delete processing, and (iii) reducing the first count by an amount corresponding to the recovered logical committed storage space.

In certain arrangements, the volume family has at least one branch including a sequence of at least some of the plurality of data volumes in the volume family; the volume family has an associated family identifier (ID), each branch of the volume family has an associated branch ID, and each data volume in the volume family has an associated volume ID; the family ID, the branch ID, and the volume ID for each data volume in the volume family are referred to herein collectively as an IO key; a first branch of the volume family includes a writable volume; and, the method further includes (i) receiving a write request at the first data storage appliance, the write request requesting that a data page be written to the writable volume of the volume family, (ii) incorporating the IO key into the write request, and (iii) forwarding the write request along a write path to effect writing of the data page to the writable volume of the volume family.

In certain arrangements, the method further includes maintaining the IO key in a namespace index node (inode) of the first data storage appliance.

In certain arrangements, the method further includes maintaining a mapping hierarchy of the sequence of data volumes, in which the mapping hierarchy includes at least a volume level with a plurality of volume nodes corresponding to the sequence of data volumes, respectively, and a leaf level with a plurality of leaf nodes corresponding to a plurality of leaf pages, respectively, and each leaf page points to a data page of a respective one of the sequence of data volumes.

In certain arrangements, each leaf page has an attribute specifying an owner volume ID of an owner of the data page pointed to by the leaf page, and the method further includes, having written the data page to the writable volume, setting an owner volume ID in a leaf page of the mapping hierarchy pointing to the data page to a current latest volume ID of the writable volume.

In certain arrangements, the method further includes (i) creating a snapshot volume in the first branch of the volume family based on the writable volume, (ii) assigning the current latest volume ID to the snapshot volume, and (iii) assigning a new latest volume ID to the writable volume.

In certain arrangements, the method further includes, having created the snapshot volume in the first branch of the volume family, setting the owner volume ID in the leaf page of the mapping hierarchy pointing to the data page to the new latest volume ID of the writable volume.

In certain arrangements, the method further includes maintaining a third count representing a third amount of physical storage space allocated to the plurality of data volumes in the volume family, in which the third amount of physical storage space corresponds to a number of data pages among a total number of data pages written to the snapshot volume that were overwritten in an immediate sequential next volume in the first branch of the volume family, taking into account a logical size of the snapshot volume.

In certain embodiments, a data storage appliance configured to perform space accounting for volume families includes at least one storage device configured to store a plurality of data volumes of a volume family, a memory configured to store executable instructions, and storage processing circuitry configured to execute the executable instructions out of the memory (i) to maintain a first count representing a first amount of physical storage space allocated to the plurality of data volumes in the volume family based on a number of data pages written to the respective data volumes, (ii) to maintain a second count representing a second amount of physical storage space allocated to the plurality of data volumes in the volume family, the second amount of physical storage space corresponding to an amount of physical storage space owned by the volume family, and (iii) based on one or more of the first amount of physical storage space and the second amount of physical storage space, to perform a migration of the plurality of data volumes in the volume family to a second data storage appliance, the first amount of physical storage space corresponding to an amount of physical storage space required to receive the volume family at the second data storage appliance, the second amount of physical storage space corresponding to an amount of physical storage space recovered having performed the migration of the volume family.

In certain arrangements, the data pages include one or more deduplicated data pages, and the storage processing circuitry is further configured to execute the executable instructions out of the memory to maintain a deduplication domain for each deduplicated data page written to the respective data volumes, in which the deduplication domain consists of data segments within the volume family.

Other functions and aspects of the claimed features of this disclosure will be evident from the Detailed Description that follows.

BRIEF DESCRIPTION OF THE DRAWINGS

The foregoing and other objects, features and advantages will be apparent from the following description of particular embodiments of the disclosure, as illustrated in the accompanying drawings in which like reference characters refer to the same parts throughout the different views.

FIG. 1a is a block diagram of an exemplary clustered storage environment, in which techniques may be practiced for performing space accounting for volume families in a data storage system;

FIG. 1b is a block diagram of an exemplary data storage appliance included in the clustered storage environment of FIG. 1a;

FIG. 5b is a block diagram of a detailed view of the first key-value store of FIG. 5a;

DETAILED DESCRIPTION

Figure 1C:
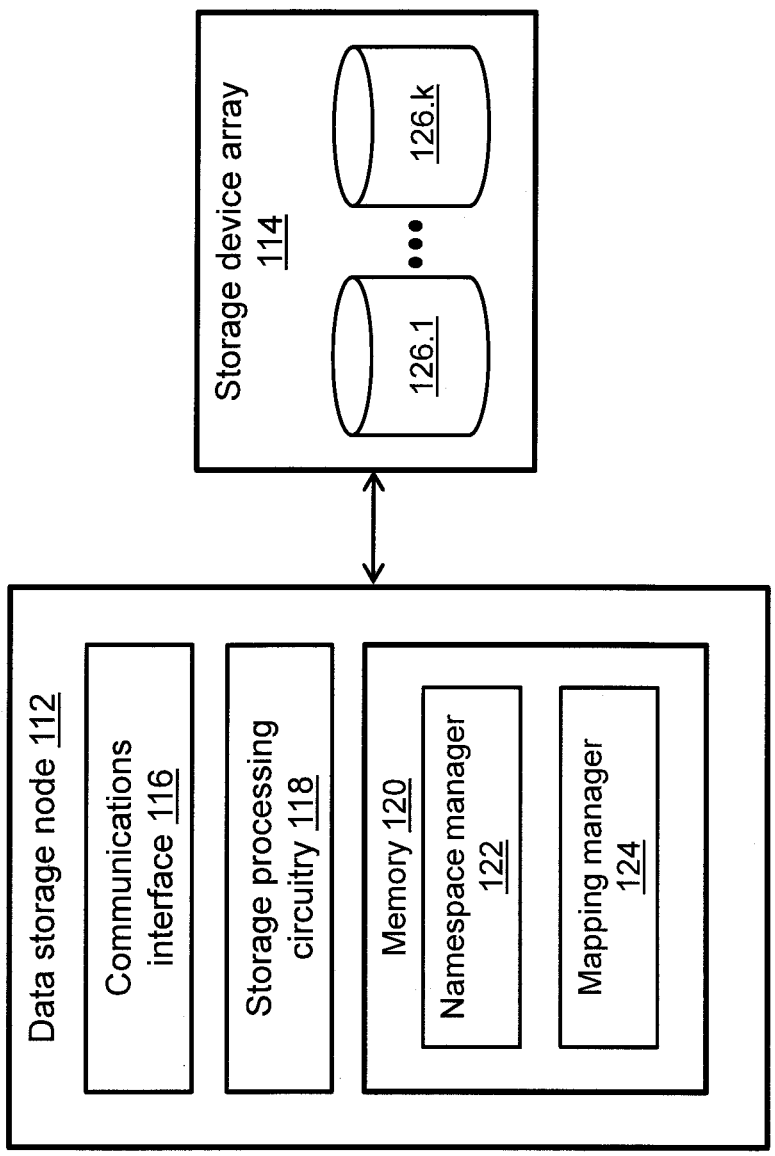
FIG. 1c is a block diagram of an exemplary data storage node included in the data storage appliance of FIG. 1b.

Techniques are disclosed herein for performing space accounting for volume families in a data storage system. The disclosed techniques can include maintaining two (2) counters for each volume family, namely, (i) a first counter that can track a first amount of physical storage space allocated to all data volumes in the volume family based on the number of data pages written to the respective data volumes (also referred to herein as the "FamilyAddedCount"), and (ii) a second counter that can track a second amount of physical storage space owned by the volume family (also referred to herein as the "FamilyOwnedCount"), and maintaining a single counter for each data volume in each branch of the volume family, namely, a third counter that can track a number of data pages among a total number of data pages written to the data volume that were overwritten in the immediate sequential next volume in the same branch as the data volume (also referred to herein as the "SnapOwnedCount"). By maintaining, for each volume family, a first counter and a second counter for tracking the FamilyAddedCount and the FamilyOwnedCount, respectively, and, for each data volume in the volume family, a third counter for tracking the SnapOwnedCount, several space accounting metrics can be obtained that can allow data storage activities such as data storage recovery and/or data migration, among others, to be performed more efficiently.

FIG. 1a depicts an illustrative embodiment of a clustered storage environment 100, in which techniques can be practiced for performing space accounting for volume families in a data storage system. As shown in FIG. 1a, the clustered storage environment 100 can include a plurality of host computers 102.1, 102.2, ..., 102.n, at least one storage domain 104, and a system administrator computer 107, which are interconnected by a communications medium 103 that can include at least one network 106. For example, each of the plurality of host computers 102.1, ..., 102.n may be configured as a web server computer, a file server computer, an email server computer, an enterprise server computer, or any other suitable client or server computer or computerized device. Further, the system administrator computer 107 may be remote from (such as in a data center) or local to the storage domain 104 within the clustered storage environment 100.

As further shown in FIG. 1a, the storage domain 104 can include, as members of the storage domain 104, a plurality of data storage appliances 108.1, 108.2, ..., 108.m. In the storage domain 104, the data storage appliance 108.1 can be elected or otherwise designated to perform (at least temporarily) a role of a primary storage appliance, while each of the remaining data storage appliances 108.2, . . . , 108.m perform (at least temporarily) a role of a secondary storage appliance. The storage domain 104 can further include a local area network (LAN) 110 such as an Ethernet network or any other suitable network, which is configured to interconnect the plurality of data storage appliances 108.1, . . . , 108.m. A plurality of LANs (like the LAN 110) included in a plurality of storage domains (like the storage domain 104) can be interconnected by a network 105, such as a metropolitan area network (MAN), a wide area network (WAN), or any other suitable network.

Within the clustered storage environment 100 of FIG. 1a, the system administrator computer 107 can be configured to execute program instructions to enable a system administrator or other user to define and/or configure the storage domain 104. Further, the plurality of host computers 102.1, . . . , 102.n can be configured to provide, over the network 106, storage input/output (IO) requests (e.g., small computer system interface (SCSI) commands, network file system (NFS) commands) to the respective storage appliances (primary or secondary) 108.1, . . . , 108.m of the storage domain 104. For example, such storage IO requests (e.g., read requests, write requests) may direct the respective storage appliances (primary or secondary) 108.1, . . . , 108.m to read and/or write data pages, data files, data blocks, and/or any other suitable data elements from/to data volumes (e.g., virtual volumes (VVOLs), logical units (LUNs)), file systems, and/or any other suitable storage objects stored in association with the respective storage appliances 108.1, . . . , 108.m.

The communications medium 103 can be configured to interconnect the plurality of host computers 102.1, . . . , 102.n with the respective storage appliances 108.1, . . . , 108.m of the storage domain 104 to enable them to communicate and exchange data signals. As shown in FIG. 1a, the communications medium 103 is illustrated as a "cloud" to represent a variety of different communications topologies, including, but not limited to, a backbone topology, a hub and spoke topology, a loop topology, an irregular topology, or any suitable combination thereof. As such, the communications medium 103 can include, but is not limited to, copper-based data communications devices and cabling, fiber optic devices and cabling, wireless devices, or any suitable combination thereof. Further, the communications medium 103 can be configured to support storage area network (SAN)-based communications, network attached storage (NAS)-based communications, LAN-based communications, MAN-based communications, WAN-based communications, wireless communications, distributed infrastructure communications, and/or any other suitable wired, wireless, or fiber communications.

FIG. 1b depicts an illustrative embodiment of an exemplary data storage appliance 108 included in the storage domain 104 of FIG. 1a. It is noted that each of the data storage appliances (primary or secondary) 108.1, . . . , 108.m included in the storage domain 104 can be configured like the data storage appliance 108 of FIG. 1b. As shown in FIG. 1b, the data storage appliance 108 can include two data storage nodes 112.1, 112.2 for providing high availability within the clustered storage environment 100. In the data storage appliance 108, the data storage node 112.1 can be elected or otherwise designated to perform (at least temporarily) a role of a primary storage node, while the data storage node 112.2 performs (at least temporarily) a role of a secondary storage node. For example, in the data storage appliance 108, the data storage node (primary) 112.1 may (i) receive storage IO requests from one or more of the host computers 102.1, . . . , 102.n over the network 106, (ii) in response to the storage IO requests, read and/or write data pages, data files, data blocks, and/or any other suitable data elements from/to one or more VVOLs, LUNs, file systems, and/or any other suitable storage objects stored in association with the data storage node (primary) 112.1, and, (iii) at least at intervals, synchronize data stored in association with the data storage node (primary) 112.1 with corresponding data stored in association with the data storage node (secondary) 112.2. In the event of a failure of the data storage node (primary) 112.1, the data storage node (secondary) 112.2 can assume the role of the primary storage node, providing high availability within the clustered storage environment 100.

FIG. 1c depicts an illustrative embodiment of an exemplary data storage node 112 included in the data storage appliance 108 of FIG. 1b. It is noted that each of the data storage nodes (primary and secondary) 112.1, 112.2 of FIG. 1b can be configured like the data storage node 112 of FIG. 1c. As shown in FIG. 1c, the data storage node 112 can include a communications interface 116, storage processing circuitry 118, and a memory 120. The communications interface 108 can include SCSI target adapters, network interface adapters, and/or any other suitable adapters for converting electronic, wireless, and/or optical signals received over the network 106 to a form suitable for use by the storage processing circuitry 118. The memory 120 can include persistent memory (e.g., flash memory, magnetic memory) and non-persistent cache memory (e.g., dynamic random access memory (DRAM), static random access memory (SRAM)), and can accommodate a variety of specialized software constructs, including, but not limited to, namespace management code and data (also referred to herein as the "namespace manager"; see reference numeral 122) and mapping management code and data (also referred to herein as the "mapping manager"; see reference numeral 124).

The namespace manager 122 can be configured to maintain a namespace of storage objects, such as volumes (e.g., VVOLs, LUNs), file systems, and/or any other suitable storage objects, accessible to the plurality of host computers 102.1, . . . , 102.n. In general, a namespace is a point-in-time (PIT) logical collection of such storage objects, each of which can be represented by an index node (also referred to herein as an "inode"). In one embodiment, the namespace maintained by the namespace manager 122 can include a set of storage objects (e.g., VVOLs) organized as a collection of inodes. For example, each such VVOL may be made up of one or more extents, each of which may correspond to a range of storage sizes (e.g., 1 megabyte (Mb), 4 Mbs) in a logical address space. Further, the range of storage sizes may correspond to a range of contiguous or noncontiguous logical addresses spanning some or all of the VVOL.

The mapping manager 124 can be configured to map extents of volumes (e.g., VVOLs, LUNs) to corresponding redundant array of independent disk (RAID) addresses, which, in turn, can be mapped to corresponding drive locations in an underlying storage device array 114. The storage device array 114 can include a plurality of storage drives 126.1, . . . 126.k, such as magnetic disk drives, electronic flash drives, and/or any other suitable storage drives. Further, the storage drive may be locally attached to an IO channel of the data storage node 112, while also being accessible over the network 106. It is noted that the plurality of storage drives 126.1, . . . 126.k can be a system of storage drives or devices such as a collection of drives (e.g., a RAID group). In one embodiment, the storage device array 114 can be implemented as a dual-ported drive, which can be shared between the data storage node (primary) 112.1 and the data storage node (secondary) 112.2 of the data storage appliance 108. The storage processing circuitry 118 can include one or more physical storage processors or engines running specialized software, data movers, director boards, blades, IO modules, storage drive controllers, switches, and/or any other suitable computer hardware or combination thereof. In one embodiment, the storage processing circuitry 118 can process storage IO requests provided by the respective host computers 102.1, . . . , 102.n over the communications medium 103, and store host data in a RAID environment implemented by the storage device array 114.

In the context of the storage processing circuitry 118 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein. For example, such media may be considered to be articles of manufacture, and may be transportable from one data storage appliance to another data storage appliance.

During operation, the data storage node 112 (see FIG. 1c) included in the data storage appliance 108 (see FIG. 1b) can perform space accounting for volume families within the storage domain 104. Each volume family can include at least one branch, and each branch can include one or more child volumes (e.g., snapshot volumes) that are sequential copies of a parent volume. Such space accounting performed by the data storage node 112 can include maintaining two (2) counters for each volume family, namely, (i) a first counter that can track a first amount of physical storage space allocated to all data volumes in the volume family based on the number of data pages written to the respective data volumes, and (ii) a second counter that can track a second amount of physical storage space owned by the volume family. Such a volume family is deemed to be an owner of the amount of physical storage space allocated to data volumes in the volume family, so long as a deduplication domain for each deduplicated data page written to the data volumes consists of data segments within the volume family. For example, each data segment may correspond to a single data block, a fraction of a data block, multiple data blocks, or any other suitable fraction or number of the data blocks within a data page (e.g., 4 kilobytes (kb)). Further, each data page may include a plurality of data blocks in sequential logical block address (LBA) order. The first amount of physical storage space tracked by the first counter is referred to herein as the "FamilyAddedCount," and the second amount of physical storage space tracked by the second counter is referred to herein as the "FamilyOwnedCount."

Such space accounting performed by the data storage node 112 can further include maintaining, for each data volume in each branch of the volume family, a third counter that can track a number of data pages among a total number of data pages written to the data volume that were overwritten in the immediate sequential next volume in the same branch as the data volume. The number tracked by the third counter, referred to herein as the "SnapOwnedCount," can provide an indication of the number of data pages owned by a snapshot volume. Such a snapshot volume is deemed to be an owner of a data page if the snapshot volume is the data volume to which the data page was last written. Having obtained the FamilyAddedCount, the FamilyOwnedCount, and the SnapOwnedCount, several space accounting metrics can be generated, determined, or otherwise obtained from one or more of the respective counts, including (i) a "deduplication ratio" metric, (ii) a "snapshot savings" metric, (iii) a "physical storage space recovered upon deletion of a volume family" metric, and (iv) a "physical storage space required to receive a volume family" metric. By maintaining, for each volume family, a first counter and a second counter for tracking the FamilyAddedCount and the FamilyOwnedCount, respectively, and, for each data volume in the volume family, a third counter for tracking the SnapOwnedCount, several space accounting metrics can be obtained that can allow data storage activities such as data storage recovery and/or data migration, among others, to be performed more efficiently.

Figure 2:
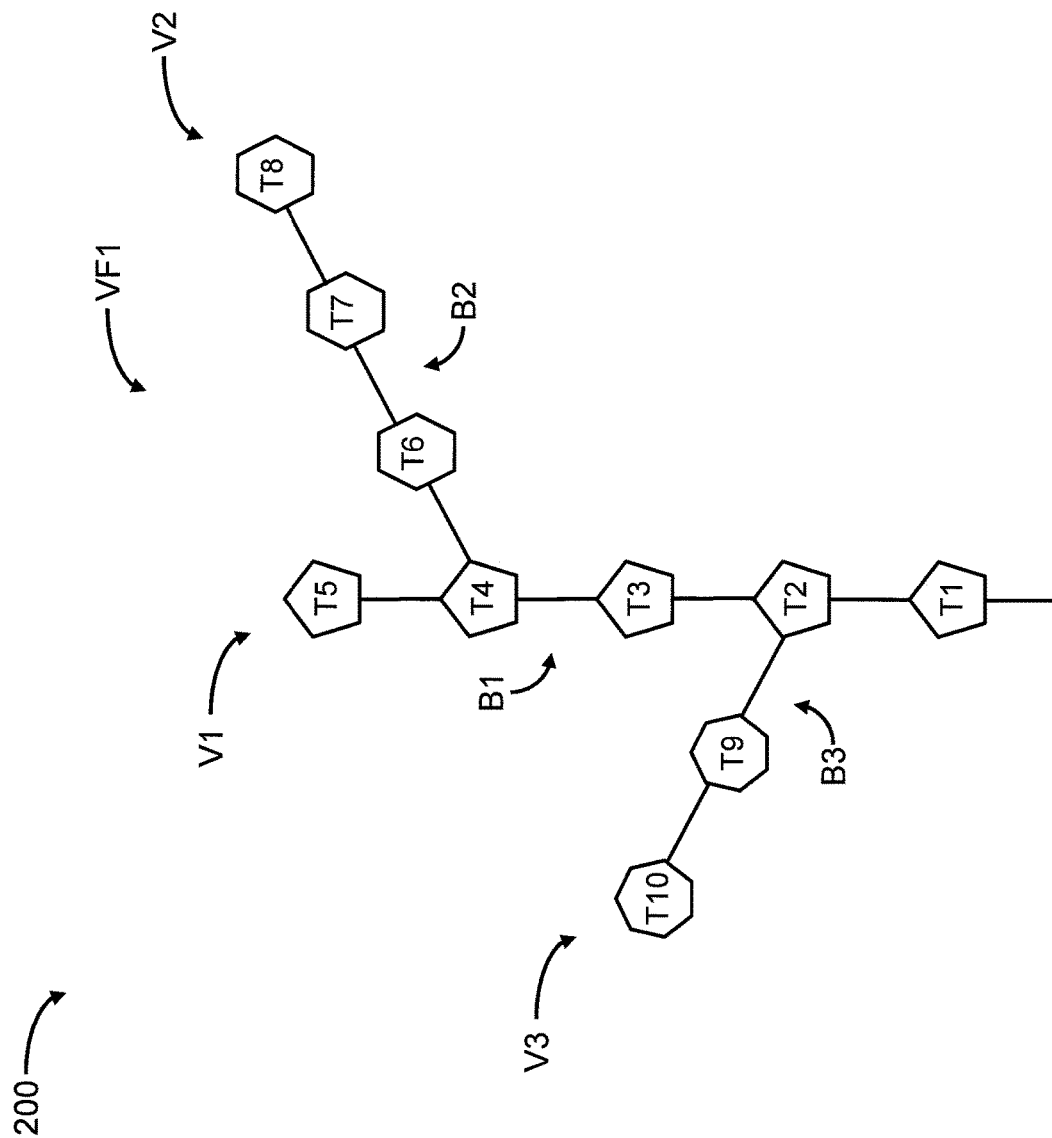
FIG. 2 is a block diagram of an exemplary volume family including a plurality of branches, each of which includes a sequence of data volumes.

FIG. 2 depicts an acyclic graph 200 representing an exemplary volume family VF1. The volume family VF1 includes a plurality of branches B1, B2, B3, each of which includes one or more read-only snapshot volumes that are sequential copies of a writable parent volume. As shown in FIG. 2, the branch B1 includes a plurality of snapshot volumes T1, T2, T3, T4, which are sequential point-in-time (PIT) copies of a parent volume T5 (also referred to herein as the "primary volume"). The branch B2 includes a plurality of snapshot volumes T6, T7, which are sequential PIT copies of a parent volume T8 (also referred to herein as a "clone volume"). The branch B3 includes a single snapshot volume T9, which is a PIT copy of a parent volume T10 (also referred to herein as a "clone volume"). It is noted that the volumes T1, T2, T3, T4, T5 in the branch B1 may each correspond to a version of a volume V1, the volumes T6, T7, T8 in the branch B2 may each correspond to a version of a volume V2, and the volumes T9, T10 in the branch B3 may each correspond to a version of a volume V3.

In general, an acyclic graph representing a volume family (such as the acyclic graph 200 representing the volume family VF1; see FIG. 2) can be constructed by assigning a volume identifier (ID) to a newly created primary volume, and, over time, assigning monotonically increasing volume IDs to the primary volume and one or more sequential snapshot copies of the primary volume to form a first branch of the volume family (as illustrated in FIG. 2 by the monotonically increasing tag designations T1, T2, T3, T4 of the four (4) snapshot volumes and T5 of the single primary volume in the branch B1 of the volume family VF1). It is noted that the writable primary volume (e.g., the primary volume T5; see FIG. 2) is assigned the latest volume ID in the first branch (e.g., the branch B1; see FIG. 2) of the volume family (e.g., the volume family VF1; see FIG. 2). In other words, if a snapshot volume is created based on a primary volume of a volume family, then the snapshot volume is assigned the current latest volume ID in a first branch of the volume family, while the primary volume is assigned a new latest volume ID in the first branch of the volume family.

Having obtained at least part of the first branch of the volume family, a writable clone volume can be created based on a selected snapshot volume in the first branch. With reference to the acyclic graph 200 representing the volume family VF1 (see FIG. 2), it is understood that an initial version of the clone volume T8 in the branch B2 was created based on the snapshot volume T4 in the branch B1. Similarly, an initial version of the clone volume T10 in the branch B3 was created based on the snapshot volume T2 in the branch B1. Like the primary volume (e.g., the primary volume T5; see FIG. 2) in the first branch of the volume family described hereinabove, each clone volume (e.g., the clone volume T8 or T10; see FIG. 2) is assigned the latest volume ID in a new branch (e.g., the branch B2 or B3; see FIG. 2) of the volume family. In other words, if a snapshot volume is created based on a clone volume in a new branch of a volume family, then the snapshot volume is assigned the current latest volume ID in the new branch of the volume family, while the clone volume is assigned a new latest volume ID in the new branch of the volume family. It is noted that the first branch and subsequent new branches of a volume family are assigned monotonically increasing branch IDs (as illustrated in FIG. 2 by the monotonically increasing tag designations B1, B2, B3 of the three (3) branches in the volume family VF1). Further, each branch of a volume family has a corresponding branch root volume.

To facilitate the space accounting performed by the data storage node 112 (see FIG. 1c), the data storage node 112 can assign, to each data volume in a volume family, (i) a corresponding volume family ID ("Family ID"), (ii) a corresponding branch ID ("Branch ID"), and (iii) a corresponding volume ID ("Volume ID"). In one embodiment, the namespace manager 122 (see FIG. 1c) can be configured to maintain a Family ID, a Branch ID, and a Volume ID for each data volume in a volume family stored in association with the data storage node 112. As described herein, the namespace maintained by the namespace manager 122 can include a set of storage objects (e.g., VVOLs) organized as a collection of inodes. Such a collection of inodes can be organized with associated namespace metadata, including a namespace inode that can be configured to store information regarding the collection of inodes (including the Family ID, the Branch ID, and the Volume ID for each data volume in a volume family) in an inode file.

Figure 3:
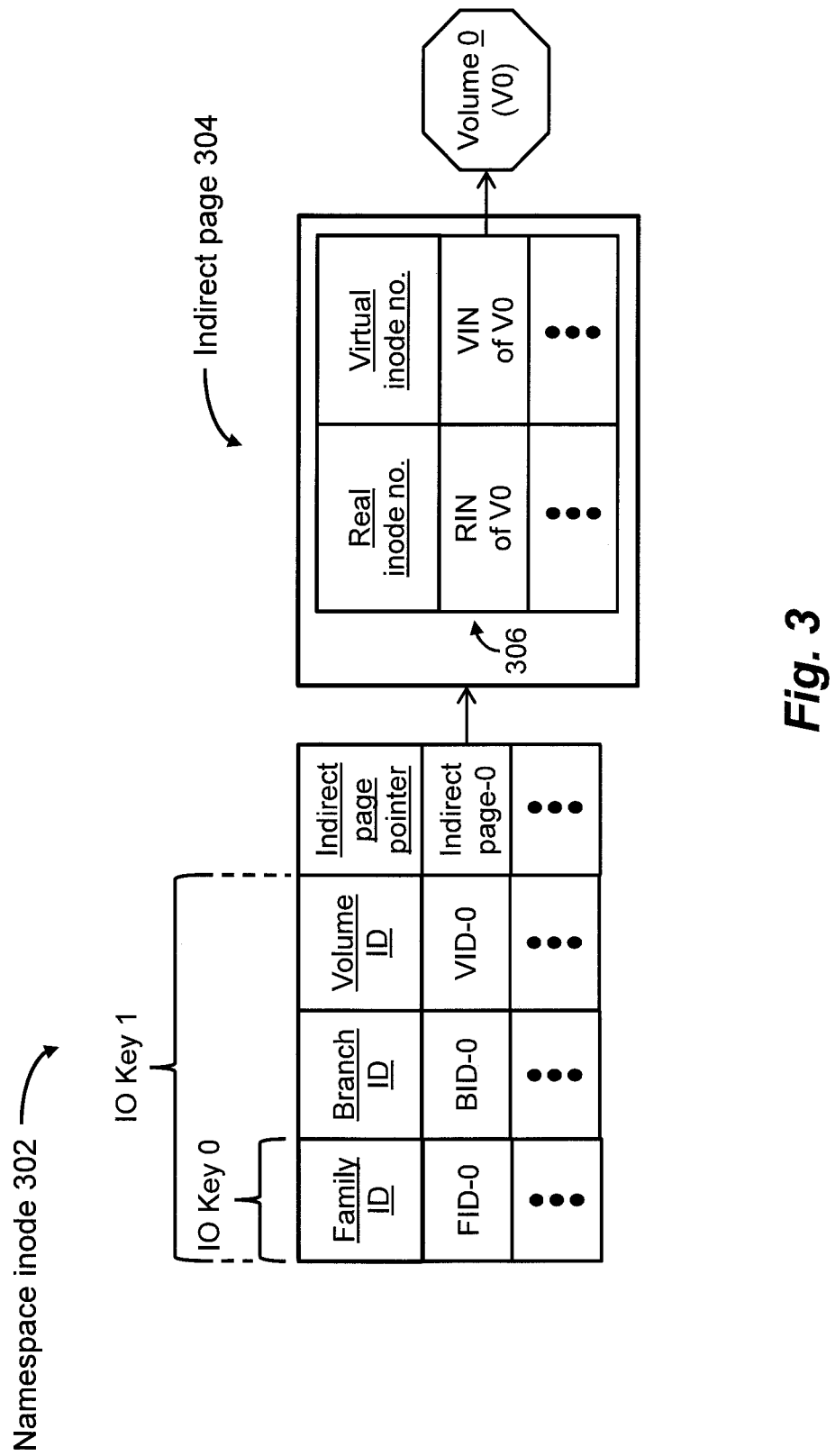
FIG. 3 is a block diagram of an exemplary namespace index node (inode) configured to include a volume family identifier (ID), a branch ID, and a volume ID for each data page of a data volume in a volume family.

FIG. 3 depicts an exemplary namespace inode 302 that can be maintained by the namespace manager 122 of the data storage node 112. As shown in FIG. 3, the namespace inode 302 can be configured to store a Family ID, a Branch ID, and a Volume ID for one or more data volumes stored in association with the data storage node 112. For example, for an exemplary data volume "V0" ("Volume 0") in a volume family, the namespace inode 302 may store a Family ID, "FID-0," a Branch ID, "BID-0," and a Volume ID, "VID-0." It is noted that the Family ID is also referred to herein as the "IO key 0," and that the Family ID, the Branch ID, and the Volume ID are also referred to herein collectively as the "IO key 1." The namespace inode 302 may also store an indirect page pointer ("Indirect page pointer"), "Indirect page-0," which points to an indirect page 304. The indirect page 304 can be configured to store information pertaining to the set of volumes included in the namespace maintained by the namespace manager 116. For example, the stored information may include an entry 306 that stores information pertaining to the Volume 0, including a real inode number ("RIN") for the Volume 0, as well as a virtual inode number ("VIN") for the Volume 0. It is further noted that, while the storage processing circuitry 118 services a write request from one of the host computers 102.1, . . . , 102.n for writing a data page "0" to the Volume 0, the namespace manager 122 can incorporate the appropriate Family ID, Branch ID, and Volume ID into the write request before it is forwarded along a write path to the mapping manager 124.

To further facilitate the space accounting performed by the data storage node 112 (see FIG. 1c), the data storage node 112 can maintain an owner volume ID for each data page of a data volume stored in association with the data storage node 112. As employed herein, the owner volume ID provides, for each data page, an indication of the data volume to which the data page was last written. In one embodiment, for each data page, the owner volume ID can be stored in a corresponding leaf page at a leaf level of a mapping hierarchy, which can be maintained by the mapping manager 124.

Figure 4:
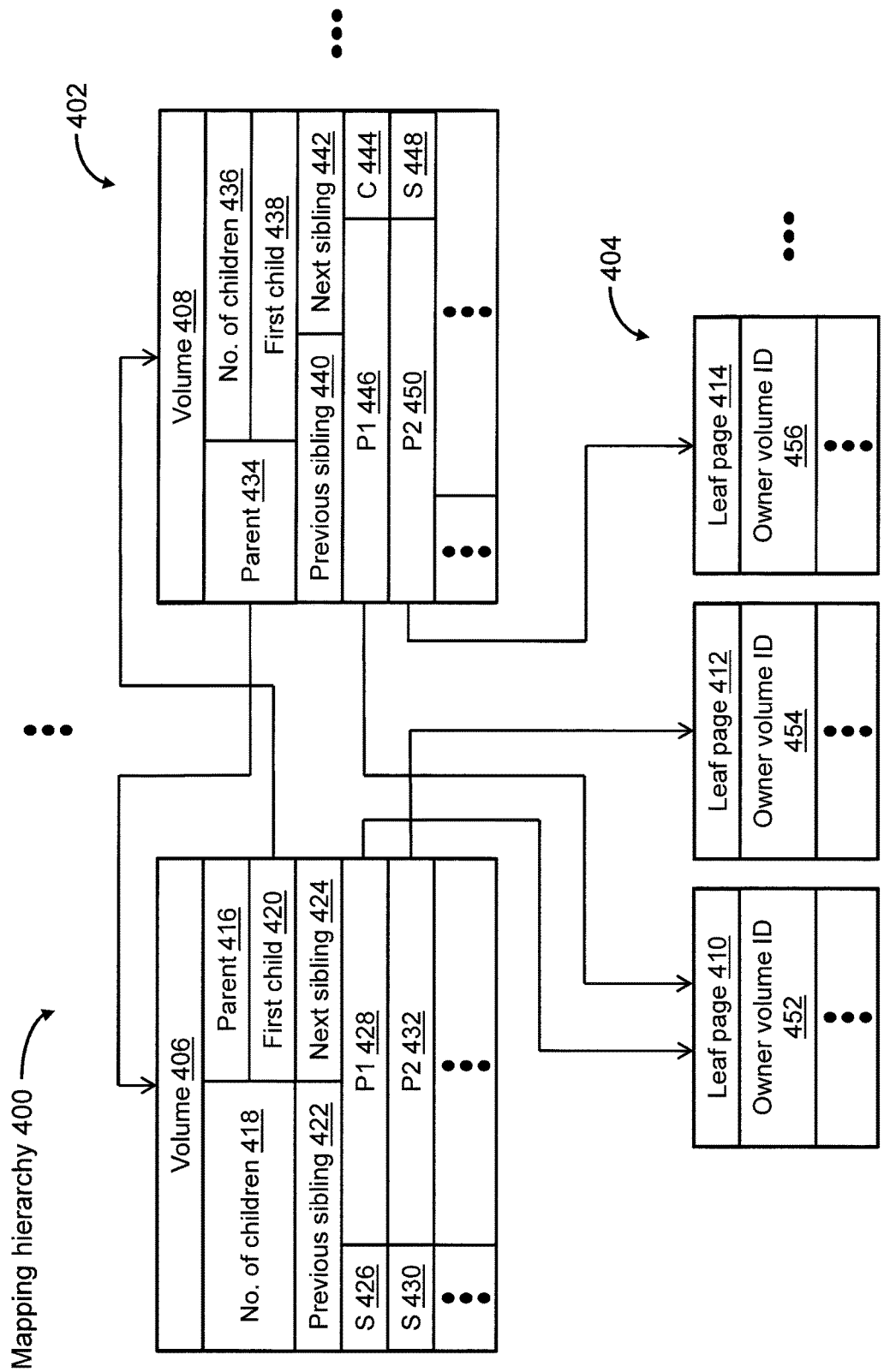
FIG. 4 is a block diagram of an exemplary mapping hierarchy for a plurality of exemplary data volumes in a volume family.

FIG. 4 depicts an exemplary mapping hierarchy 400 for a plurality of data volumes (such as a volume 406 and a volume 408) in a volume family. As shown in FIG. 4, the mapping hierarchy 400 can be configured as a multi-level tree (e.g., a B+ tree) that includes at least a volume level 402 and a leaf level 404. The volume level 402 can have nodes corresponding to at least the volume 406 and the volume 408, and the leaf level 404 can have nodes corresponding to at least a leaf page 410, a leaf page 412, and a leaf page 414. It is noted, however, that the multi-level tree of the mapping hierarchy 400 can include many more levels than the two levels 402, 404. For example, the multi-level tree may include a multitude of volume levels above the volume level 402.

As shown in FIG. 4, the node corresponding to the volume 406 can include multiple attributes corresponding to a parent 416, a number of children 418, a first child 420, a previous sibling 422, and a next sibling 424. Likewise, the node corresponding to the volume 408 can include multiple attributes corresponding to a parent 434, a number of children 436, a first child 438, a previous sibling 440, and a next sibling 442. The parent attributes 416, 434 correspond to pointers to locations of parent volumes of the respective volumes 406, 408, if any. For example, the parent attribute 434 of the volume 408 may point to a location of the volume 406, which may be the parent volume of the volume 408. The number of children attributes 418, 436 provide indications of the number of child volumes of the respective volumes 406, 408, if any. The first child attributes 420, 438 correspond to pointers to locations of first child volumes of the respective volumes 406, 408, if any. For example, the first child attribute 420 of the volume 406 may point to a location of the volume 408, which may be the first child volume (e.g., snapshot volume) of the volume 406. It is noted that, once the first child volumes of the volumes 406, 408 are located, additional child volumes of the respective volumes 406, 408 may be located by following associated previous and/or next sibling pointers. The previous sibling attributes 422, 440 correspond to pointers to locations of previous sibling volumes for child volumes of the respective volumes 406, 408, if any. The next sibling attributes 424, 442 correspond to pointers to locations of next sibling volumes for child volumes of the respective volumes 406, 408, if any. As described herein, the owner volume ID for each data page of a data volume can be stored in a corresponding leaf page (such as the leaf page 410, 412, or 414; see FIG. 4) at the leaf level 404 of the mapping hierarchy 400. Accordingly, the leaf page 410 can include an attribute corresponding to an owner volume ID 452. Likewise, the leaf page 412 can include an attribute corresponding to an owner volume ID 454, and the leaf page 414 can include an attribute corresponding to an owner volume ID 456.

As further shown in FIG. 4, the node corresponding to the volume 406 can further include leaf pointers (such as a leaf pointer P1 428 and a leaf pointer P2 432) to locations of the leaf page 410, the leaf page 412, and/or the leaf page 414.

For example, the leaf pointer P1 428 may point to a location of the leaf page 410, and the leaf pointer P2 432 may point to a location of the leaf page 412. Likewise, the node corresponding to the volume 408 can further include leaf pointers (such as a leaf pointer P1 446 and a leaf pointer P2 450) to locations of the leaf page 410, the leaf page 412, and/or the leaf page 414. For example, the leaf pointer P1 446 may point to a location of the leaf page 410, and the leaf pointer P2 450 may point to a location of the leaf page 414. In addition, each of the leaf pointer P1 428, the leaf pointer P2 432, the leaf pointer P1 446, and the leaf pointer P2 450 can include a source ("S") attribute or a copy ("C") attribute. For example, the leaf pointer P1 428 may include a source (S) attribute 426, which indicates that the volume 406 is the source of a data page corresponding to the leaf page 410; and, the leaf pointer P2 432 may include a source (S) attribute 430, which indicates that the volume 406 is the source of a data page corresponding to the leaf page 412. Further, the leaf pointer P1 446 may include a copy (C) attribute 444, which indicates that the volume 406 shares a copy of the data page corresponding to the leaf page 410 with the volume 408; and, the leaf pointer P2 450 may include a source (S) attribute 448, which indicates that the volume 408 is the source of a data page corresponding to the leaf page 414. It is noted that each of the leaf pages 410, 412, and 414 can further include page pointers (not shown) to their respective corresponding data pages.

As described herein, the space accounting performed by the data storage node 112 can include maintaining two (2) counters for each volume family, i.e., (i) a first counter that can track a first amount (the "FamilyAddedCount") of physical storage space allocated to all data volumes in the volume family based on the number of data pages written to the respective data volumes, and (ii) a second counter that can track a second amount (the "FamilyOwnedCount") of physical storage space owned by the volume family. In one embodiment, the mapping manager 124 can maintain, for each volume family, both the FamilyAddedCount and the FamilyOwnedCount in a key-value store 504, as illustrated in FIGS. 5a and 5b.

Figure 5A:
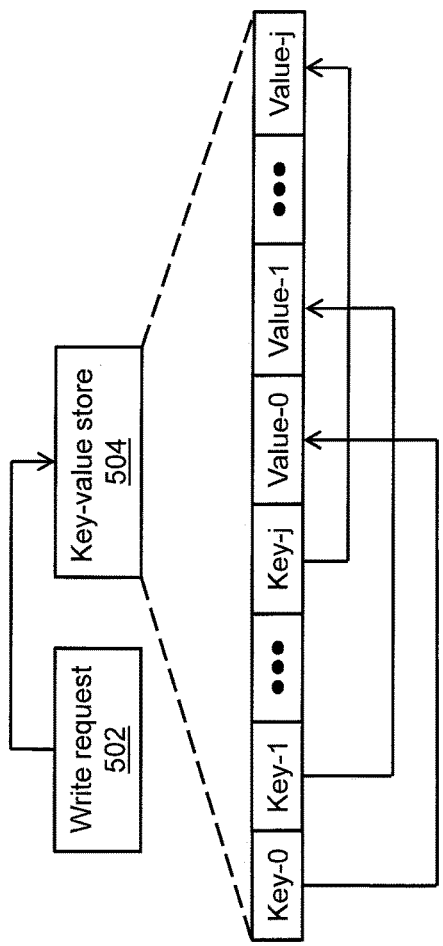
FIG. 5a is a block diagram of an exemplary write request pointing to an exemplary first key-value store for storing a plurality of first key-value pairs, each key in a first key-value pair including a volume family ID, and each value in the first key-value pair providing indications of (i) a first amount of physical storage space allocated to all data volumes in the volume family based on the number of data pages written to the respective data volumes (the "FamilyAddedCount"), and (ii) a second amount of physical storage space owned by the volume family (the "FamilyOwnedCount")
Figure 5B:
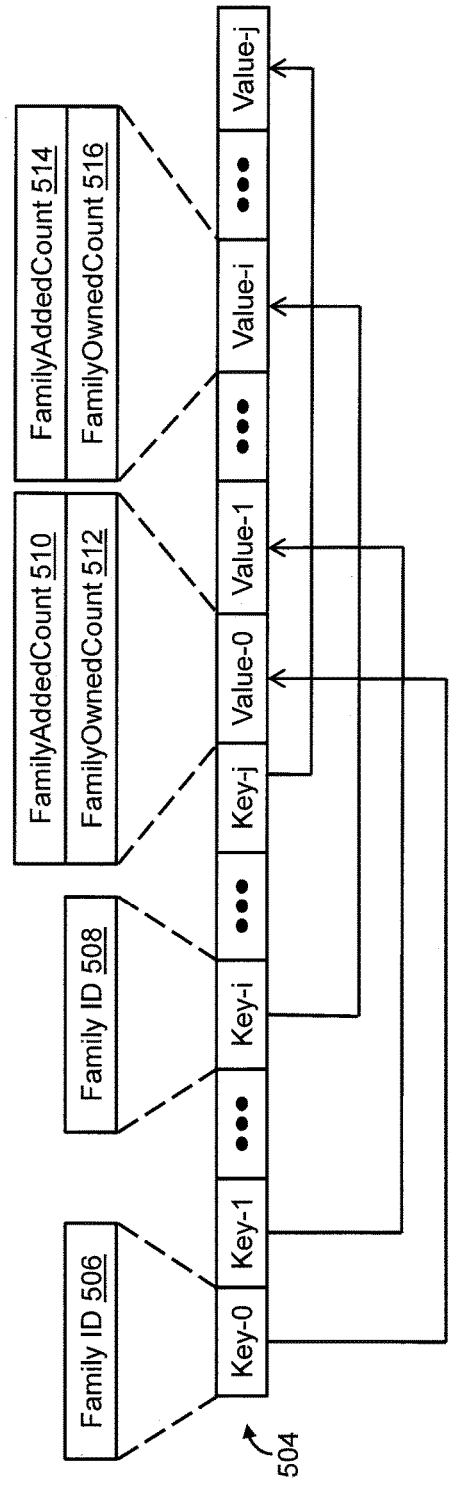

As shown in FIG. 5a, for an exemplary data page of a data volume in a volume family, a write request 502 incorporating the corresponding Family ID (the "IO key 0") can point to the key-value store 504. Further, as shown in FIGS. 5a and 5b, the key-value store 504 can include a plurality of keys 0, 1, . . . , i, . . . , j that point to or are otherwise paired with a plurality of values 0, 1, . . . , i, . . . , j, respectively. In one embodiment, the "key" in a key-value pair can be implemented by a Family ID of a data volume, while the "value" in the key-value pair can include both the FamilyAddedCount and the FamilyOwnedCount. For example, the key-0 (see FIG. 5b) of a $0^{th}$ key-value pair may be implemented by a Family ID 506 of a volume family, while the value-0 (see also FIG. 5b) of the $0^{th}$ key-value pair may include a FamilyAddedCount 510 and a FamilyOwnedCount 512 of the volume family. Likewise, the key-i (see FIG. 5b) of an $i^{th}$ key-value pair may be implemented by a Family ID 508 of a volume family, while the value-i (see also FIG. 5b) of the $i^{th}$ key-value pair may include a FamilyAddedCount 514 and a FamilyOwnedCount 516 of the volume family.

As further described herein, the space accounting performed by the data storage node 112 can also include maintaining an additional counter for each data volume in each branch of the volume family, i.e., a third counter that can track a number (the "SnapOwnedCount") of data pages among a total number of data pages written to the data volume that were overwritten in the immediate sequential next volume in the same branch as the data volume. In one embodiment, the mapping manager 124 can further maintain, for each data volume in each branch of the volume family, the SnapOwnedCount in a key-value store 518, as illustrated in FIGS. 5c and 5d.

Figure 5C:
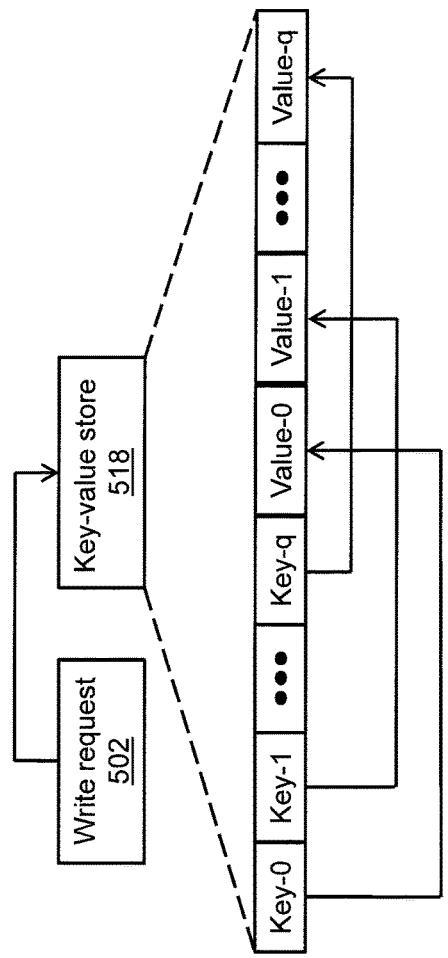
FIG. 5c is a block diagram of an exemplary write request pointing to an exemplary second key-value store for storing a plurality of second key-value pairs, each key in a second key-value pair including a volume family ID, a branch ID, and a volume ID, and each value in the second key-value pair providing an indication of a number of data pages among a total number of data pages written to a data volume that were overwritten in the immediate sequential next volume in the same branch as the data volume (the "SnapOwnedCount")
Figure 5D:
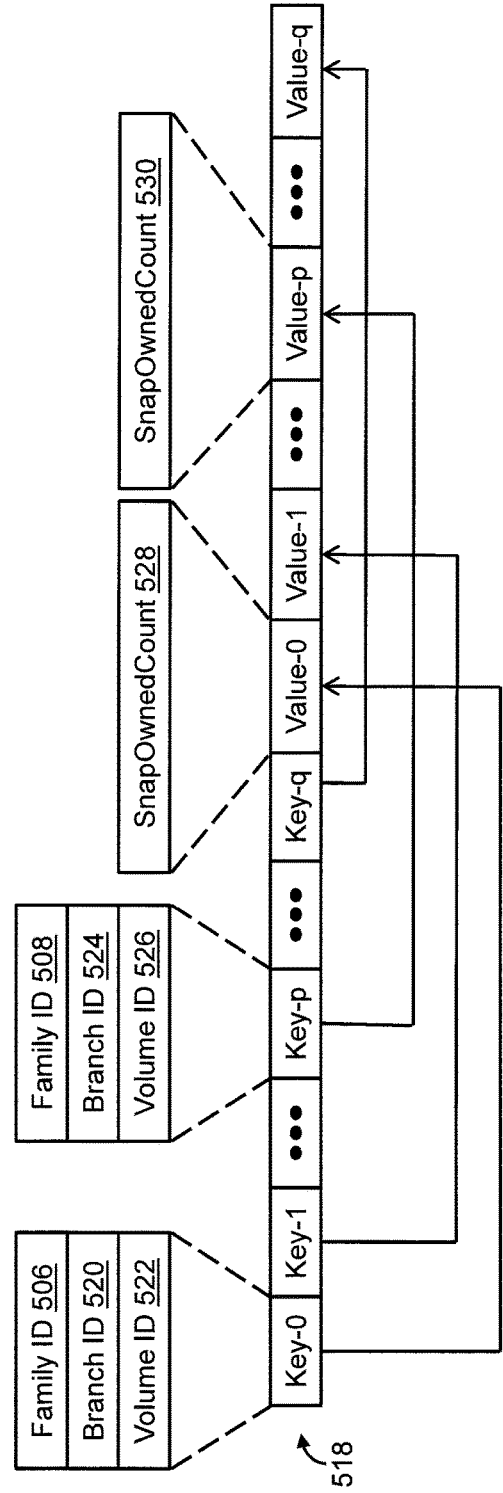
FIG. 5d is a block diagram of a detailed view of the second key-value store of FIG. 5c.

As shown in FIG. 5c, for the exemplary data page of the data volume in a branch of the volume family, the write request 502 incorporating the corresponding Family ID, the corresponding Branch ID, and the corresponding Volume ID (the "IO key 1") can point to the key-value store 518. Further, as shown in FIGS. 5c and 5d, the key-value store 518 can include a plurality of keys 0, 1, . . . , p, . . . , q that point to or are otherwise paired with a plurality of values 0, 1, . . . , p, . . . , q, respectively. In one embodiment, the "key" in a key-value pair can be implemented by a Family ID, a Branch ID, and a Volume ID of a data volume, while the "value" in the key-value pair can include the SnapOwnedCount. For example, the key-0 (see FIG. 5d) of a $0^{th}$ key-value pair may be implemented by the Family ID 506, a Branch ID 520, and a Volume ID 522 of a volume in a branch of the volume family, while the value-0 (see also FIG. 5d) of the $0^{th}$ key-value pair may include a SnapOwnedCount 528 of the volume in the branch of the volume family. Likewise, the key-p (see FIG. 5d) of an $p^{th}$ key-value pair may be implemented by the Family ID 508, a Branch ID 524, and a Volume ID 526 of a volume in a branch of a volume family, while the value-0 (see also FIG. 5d) of the $p^{th}$ key-value pair may include a SnapOwnedCount 530 of the volume in the branch of the volume family.

Having obtained the FamilyAddedCount and the FamilyOwnedCount for each volume family, and the SnapOwnedCount for each data volume in each branch of the volume family, several space accounting metrics can be generated, determined, or otherwise obtained from one or more of the respective counts, including (i) a "deduplication ratio" metric, (ii) a "snapshot savings" metric, (iii) a "physical storage space recovered upon deletion of a volume family" metric, and (iv) a "physical storage space required to receive a volume family" metric. For example, (i) the deduplication ratio metric may be obtained from the FamilyAddedCount and the FamilyOwnedCount, (ii) the snapshot savings metric may be obtained from the SnapOwnedCount, while taking into account the logical size of a snapshot volume, as maintained in the namespace, (iii) the physical storage space recovered upon deletion of a volume family metric may be obtained from the FamilyOwnedCount, and (iv) the physical storage space required to receive a volume family metric may be obtained from the FamilyAddedCount.

The disclosed techniques for performing space accounting for volume families within a storage domain will be further understood with reference to the following illustrative example, as well as the volume family VF1 illustrated in FIG. 2. In this example, it is assumed that the volume T1 and the volume T2 included in the branch B1 of the volume family VF1 (see FIG. 2) are ultimately created and stored in the data storage appliance 108.1 (which performs the role of a primary storage appliance) (see FIG. 1a), and that the volume T1 is initially the only volume in the volume family VF1. As such, the volume T1 is initially deemed to be the (writable) primary volume in the volume family VF1. It is further assumed that (i) the IO key 0 for the primary volume T1 corresponds to a Family ID, "FID-1," (ii) the IO key 1 for the primary volume T1 is made up of the Family ID, "FID-1," a Branch ID, "BID-1," and a Volume ID, "VID-1," (iii) the FamilyAddedCount and the FamilyOwnedCount for the volume family VF1 are each initially set to "0," and (iv) the SnapOwnedCount for the primary volume T1 is also initially set to "0."

At a first point in time, a first write request is received at the data storage appliance 108.1, requesting that a data page "1" be written to the (writable) primary volume T1. Having received the first write request at the data storage appliance 108.1, the namespace manager 122 incorporates the Family ID, "FID-1," the Branch ID, "BID-1," and the Volume ID, "VID-1" (in which the IO key 0 corresponds to the Family ID, FID-1, and the IO key 1 is made up of the Family ID, FID-1, the Branch ID, BID-1, and the Volume ID, VID-1) for the primary volume T1 into the first write request, and forwards the first write request along the write path to the mapping manager 124 to effect writing of the data page 1 to the primary volume T1. Because, at this first point in time, the primary volume T1 is the data volume to which the data page 1 was last written (i.e., the primary volume T1 is the owner of the data page 1), the owner volume ID stored in the leaf page of the mapping hierarchy for the data page 1 is set to the Volume ID of the primary volume T1, namely, VID-1.

At a second point in time, the data storage appliance 108.1 creates a (read-only) snapshot volume based on the primary volume T1. Once the snapshot volume is created, the namespace manager 122 assigns the current latest volume ID, namely, VID-1, to the snapshot volume, and assigns a new latest volume ID, namely, VID-2, to the primary volume T1. Further, for purposes of consistency in numbering, the tag designation for the primary volume is changed from "T1" to "T2," and the tag designation assigned to the snapshot volume is "T1." At this second point in time, the snapshot volume T1 and the primary volume T2 are the only volumes included in the branch B1 of the volume family VF1 (see FIG. 2). In other words, the branch B1 of the volume family VF1 now includes the snapshot volume T1, and the immediate sequential next volume in the branch B1, namely, the primary volume T2. Because the primary volume T2 is the data volume to which the data page 1 was last written (i.e., the primary volume T2 is the owner of the data page 1), the owner volume ID stored in the leaf page of the mapping hierarchy for the data page 1 is set to the Volume ID of the primary volume T2, namely, VID-2. Further, the node of the mapping hierarchy corresponding to the primary volume T2 includes a pointer to the location of the leaf page for the data page 1 that includes a source "S" attribute, and the node of the mapping hierarchy corresponding to the snapshot volume T1 includes a pointer to the location of the leaf page for the data page 1 that includes a copy "C" attribute. In addition, the SnapOwnedCount for the primary volume T2 remains set to "0," while the SnapOwnedCount for the snapshot volume T1 is initially set to "0."

At a third point in time, a second write request is received at the data storage appliance 108.1, requesting that the data page 1 on the (writable) primary volume T2 be overwritten with new data. Having received the second write request at the data storage appliance 108.1, the namespace manager 122 incorporates the Family ID, FID-1, the Branch ID, BID-1, and the Volume ID, VID-2 (in which the IO key 0 corresponds to the Family ID, FID-1, and the IO key 1 is made up of the Family ID, FID-1, the Branch ID, BID-1, and the Volume ID, VID-2) for the primary volume T2 into the second write request, and forwards the second write request along the write path to the mapping manager 124 to effect overwriting of the data page 1 on the primary volume T2. Because the data page 1 of the primary volume T2 has been overwritten while the data page 1 of the snapshot volume T1 has not been changed, the data page 1 is now unique or unshared between the primary volume T2 and the snapshot volume T1. As such, the node corresponding to the primary volume T2 includes a pointer to the location of the leaf page for the overwritten version of data page 1 that includes a source "S" attribute, and the node corresponding to the snapshot volume T1 includes a pointer to the location of the leaf page for the unchanged version of data page 1 that likewise includes a source "S" attribute.

Because the primary volume T2 is the data volume to which the overwritten version of data page 1 was last written (i.e., the primary volume T2 is the owner of the overwritten version of data page 1), the owner volume ID stored in the leaf page of the mapping hierarchy for the overwritten version of data page 1 is set to the Volume ID of the primary volume T2, namely, VID-2. Further, because the snapshot volume T1 is the data volume to which the unchanged version of data page 1 was last written (i.e., the snapshot volume T1 is the owner of the unchanged version of data page 1), the owner volume ID stored in the leaf page of the mapping hierarchy for the unchanged version of data page 1 is set to the Volume ID of the snapshot volume T1, namely, VID-1. In addition, the SnapOwnedCount for the primary volume T2 is set to "0," and the SnapOwnedCount for the snapshot volume T1 is also set to "1." It is noted that such generation of the SnapOwnedCount for a data volume in a branch of a volume family is further described in U.S. patent application Ser. No. 16/176,482 entitled EFFICIENT SPACE ACCOUNTING MECHANISMS FOR TRACKING UNSHARED PAGES BETWEEN A SNAPSHOT VOLUME AND ITS PARENT VOLUME filed Oct. 31, 2018, the disclosure of which is hereby incorporated herein by reference in its entirety.

Having obtained the SnapOwnedCount for each of the primary volume T2 and the snapshot volume T1 in the branch B1 of the volume family VF1, the FamilyAddedCount and the FamilyOwnedCount for the volume family VF1 (each of which is initially set to "0" by the mapping manager 124) can be generated, determined, or otherwise obtained, as follows. With regard to the FamilyAddedCount for the volume family VF1, a determination can be made by the mapping manager 124 regarding the amount of physical storage space allocated to each of the primary volume T2 and the snapshot volume T1, based on the number of data pages written to the respective volumes. In one embodiment, the mapping manager 124 can maintain and/or track a logical size of each of the primary volume T2 and the snapshot volume T1, in which the logical volume size corresponds to the logical committed size of the respective volume. In other words, the mapping manager 124 can maintain and/or track the logical committed storage space for each of the volumes T1 and T2, determine an accumulated amount of logical committed storage space corresponding to the respective volumes T1 and T2, and set the FamilyAddedCount for the volume family VF1 to a value indicative of the accumulated amount of logical committed storage space. The mapping manager 124 can update (e.g., increase or reduce) the FamilyAddedCount when a new data page is written to the primary volume T2 (or any other writable data volume in the volume family VF1), as well as at the end of delete processing of any snapshot volumes (e.g., the snapshot volume T1) in the volume family VF1. For example, as part of or at completion of such snapshot delete processing, the mapping manager 124 may determine an amount of logical committed storage space recovered from the snapshot delete processing, and reduce the FamilyAddedCount by a corresponding amount.

With regard to the FamilyOwnedCount for the volume family VF1, a further determination can be made by the mapping manager 124 regarding the amount of physical storage space owned by the volume family VF1. The volume family VF1 is deemed to be an owner of the amount of physical storage space allocated to the primary volume T2 and the snapshot volume T1, so long as a deduplication domain for each deduplicated data page written to the respective volumes T1, T2 consists of data segments within the volume family VF1. Such deduplication of a data page can cause one or more data segments of the data page to be shared (also referred to herein as "de-dupe sharing") among different logical addresses within the same data volume or across different data volumes. For example, each such data segment embodied as a data block may maintain a reference count to indicate a number of times that the data block is shared. Further, a reference count equal to "0" may indicate that the data block is not in-use and may be reclaimed, a reference count equal to "1" may indicate that the data block is in-use but not shared, and a reference count greater than "1" may indicate that the data block is in-use and shared within a single data volume or between different data volumes.

In one embodiment, the mapping manager 124 can maintain and/or track multiple logical address references to each data block of a data page, and determine whether or not each logical address reference to the data block is from the same data volume of a volume family. If all of the logical address references to the data block are determined to be from the same data volume, then the volume family is deemed to be an owner of the amount of physical storage space allocated to the data block. Further, if the volume family is deemed to be the owner of the amount of physical storage space allocated to each data block of a data page, then the volume family is deemed to be the owner of the amount of physical storage space allocated to the data page. Similarly, if the volume family is deemed to be the owner of the amount of physical storage space allocated to each data page of a data volume, then the volume family is deemed to be the owner of the amount of physical storage space allocated to the data volume. The mapping manager 124 can determine an accumulated amount of such physical storage space allocated to at least a portion of the respective volumes T1, T2, and set the FamilyOwnedCount for the volume family VF1 to a value indicative of the accumulated amount of physical storage space. The mapping manager 124 can also update the FamilyOwnedCount when a data segment of one of the respective volumes T1 and T2 transitions to having all of its logical address references originate from the same data volume in the volume family VF1.

It is noted that other techniques may be employed to determine the FamilyOwnedCount for a volume family. In one such technique, a 3-byte owner family ID can be used to identify the family owner for each data page, and eight (8) bytes can be maintained in the VLB entry per every 4 Kb data page. The 8 bytes can contain two (2) sum fields, namely, a first sum field for the sum of family IDs of the owner volumes for the data page, and a second sum field for the sum of other predetermined keys generated for the family IDs of the owner volumes for the data page. The same reference count field that maintains the count of de-dupe sharing of volume IDs can be used as the count of de-dupe sharing family IDs. The data page can be considered to be exclusively owned if the family IDs obtained from the first sum and the second sum agree. This technique may be employed to determine when a data page transitions from inter-family de-dupe sharing to intra-family de-dupe sharing. At that point, the physical space consumed by the data page can be accounted to the volume family.

As described herein, a "deduplication ratio" metric may be obtained from the FamilyAddedCount and the FamilyOwnedCount, a "snapshot savings" metric may be obtained from the SnapOwnedCount while taking into account the logical size of a snapshot volume, a "physical storage space recovered upon deletion of a volume family" metric may be obtained from the FamilyOwnedCount, and a "physical storage space required to receive a volume family" metric may be obtained from the FamilyAddedCount. In one embodiment, the foregoing space accounting metrics can allow data storage activities such as data storage recovery and/or data migration, among others, to be performed more efficiently. For example, a system administrator or other user of the system administrator computer 107 may wish to migrate data of the volume family VF1 from the data storage appliance 108.1 (which performs the role of a primary storage appliance) (see FIG. 1a) to the data storage appliance 108.2 (which performs the role of a secondary storage appliance) (see also FIG. 1a) within the storage domain 104. In such a scenario, the system administrator computer 107 (see also FIG. 1a) may obtain, from the data storage appliance 108.1, the FamilyOwnedCount and the FamilyAddedCount for the volume family VF1. Further, the system administrator computer 107 may determine the "physical storage space recovered upon deletion of a volume family" metric from the FamilyOwnedCount, and the "physical storage space required to receive a volume family" metric from the FamilyAddedCount. Having obtained the respective metrics, the system administrator computer 107 may determine that the data storage appliance 108.2 has a sufficient amount of storage space available to receive the data of the volume family VF1 from the data storage appliance 108.1, and may therefore perform the desired data migration. The system administrator computer 107 may also verify, having performed the data migration, the amount of physical storage space recovered at the data storage appliance 108.1 upon deletion of the volume family VF1.

Figure 6:
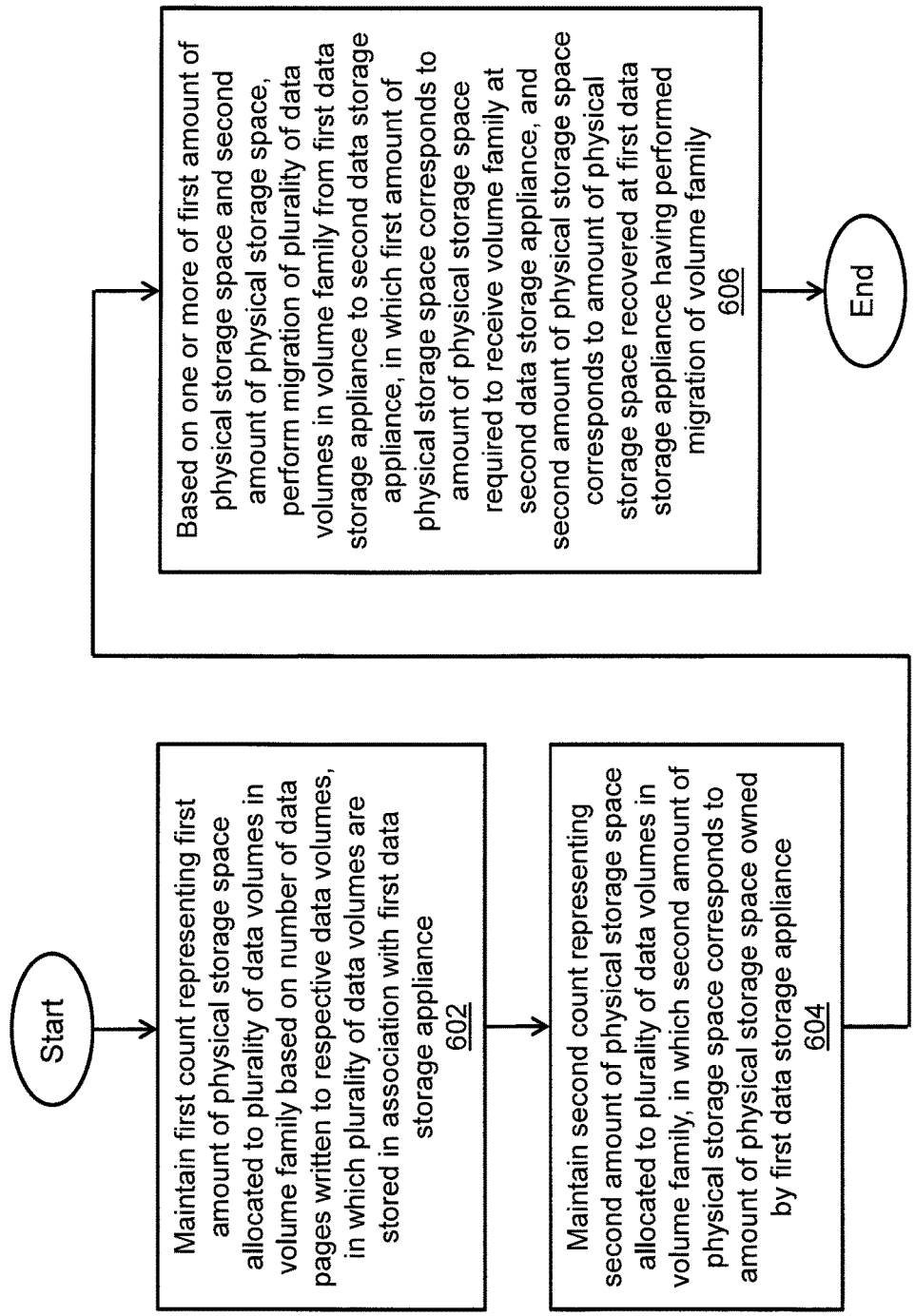
FIG. 6 is a flow diagram of an exemplary method of performing space accounting for volume families in a data storage system.

An exemplary method of performing space accounting for volume families in a data storage system is described below with reference to FIG. 6. As depicted in block 602, a first count is maintained representing a first amount of physical storage space allocated to a plurality of data volumes in a volume family based on a number of data pages written to the respective data volumes, in which the plurality of data volumes are stored in association with a first data storage appliance. As depicted in block 604, a second count is maintained representing a second amount of physical storage space allocated to the plurality of data volumes in the volume family, in which the second amount of physical storage space corresponds to an amount of physical storage space owned by the first data storage appliance. As depicted in block 606, based on one or more of the first amount of physical storage space and the second amount of physical storage space, a migration of the plurality of data volumes in the volume family is performed from the first data storage appliance to a second data storage appliance, in which the first amount of physical storage space corresponds to an amount of physical storage space required to receive the volume family at the second data storage appliance, and the second amount of physical storage space corresponds to an amount of physical storage space recovered at the first data storage appliance having performed the migration of the volume family While various embodiments of the disclosure have been particularly shown and described, it will be understood by those skilled in the art that various changes in form and details may be made therein without departing from the scope of the disclosure, as defined by the appended claims.

What is claimed is:

1. A method of performing space accounting for volume families in a data storage system, comprising:
   maintaining a first count representing a first amount of physical storage space allocated to a plurality of data volumes in a volume family based on a number of data pages written to the respective data volumes in the volume family, the plurality of data volumes being stored in association with a first data storage appliance;
   maintaining a second count representing a second amount of physical storage space allocated to the plurality of data volumes in the volume family, the second amount of physical storage space corresponding to an amount of physical storage space owned by the volume family, the plurality of data volumes in the volume family including a parent volume and a plurality of snapshot volumes that are sequential point-in-time (PIT) copies of the parent volume, and the volume family having a branch that includes the parent volume and a sequence of the sequential PIT copies;
   maintaining, for each snapshot volume in the branch of the volume family, a third count for tracking a number of data pages written to the snapshot volume that were overwritten in an immediate next sequential PIT copy in the sequence, the third count representing a third amount of physical storage space allocated to the plurality of data volumes in the volume family, and the tracked number providing an indication of a number of data pages owned by the snapshot volume in the branch of the volume family; and
   based on one or more of the first amount of physical storage space, the second amount of physical storage space, and the third amount of physical storage space, performing a migration of the plurality of data volumes in the volume family from the first data storage appliance to a second data storage appliance, the first amount of physical storage space corresponding to an amount of physical storage space required to receive the volume family at the second data storage appliance, the second amount of physical storage space corresponding to an amount of physical storage space recovered at the first data storage appliance having performed the migration of the volume family, and the third amount of physical storage space corresponding to an amount of physical storage space saved in the sequence of the sequential PIT copies included in the branch of the volume family.

2. The method of claim 1 wherein the data pages include one or more deduplicated data pages, and wherein the method further comprises:
   maintaining a deduplication domain for each deduplicated data page written to the respective data volumes, the deduplication domain consisting of data segments within the volume family.

3. The method of claim 1 wherein the data pages include a deduplicated data page, the deduplicated data page including one or more data segments that are shared among different logical addresses across the same data volume or different data volumes, and wherein the method further comprises:
   tracking multiple logical address references to each data segment of the deduplicated data page.

4. The method of claim 3 further comprising:
   determining whether one or more of the logical address references to the data segment are from the same data volume or different data volumes of the volume family; and
   having determined that one or more of the logical address references to the data segment are from the same data volume or different data volumes of the volume family, increasing the second count by an amount corresponding to a physical storage space allocated to the data segment.

5. The method of claim 3 further comprising:
   determining whether one or more of the logical address references to the data segment are from the same data volume or different data volumes of another volume family; and
   having determined that one or more of the logical address references to the data segment are from the same data volume or different data volumes of the other volume family, reducing the second count by an amount corresponding to a physical storage space allocated to the data segment.

6. The method of claim 1 wherein the maintaining of the first count representing the first amount of physical storage space allocated to the plurality of data volumes in the volume family includes tracking a logical size of each data volume, the logical size corresponding to a logical committed size of the data volume.

7. The method of claim 1 wherein the volume family has an associated family identifier (ID), wherein the family ID is referred to herein as an IO key, wherein the volume family includes a writable volume, and wherein the method further comprises:
   receiving a write request at the first data storage appliance, the write request requesting that a data page be written to the writable volume of the volume family;
   incorporating the IO key into the write request; and
   forwarding the write request along a write path to effect writing of the data page to the writable volume of the volume family.

8. The method of claim 7 further comprising:
   maintaining the IO key in a namespace index node (inode) of the first data storage appliance.

9. The method of claim 7 further comprising:
   having written the data page to the writable volume of the volume family, increasing the first count by an amount corresponding to a logical committed storage space allocated to the data page.

10. The method of claim 1 wherein the method further comprises:
    performing snapshot delete processing to delete at least one of the plurality of snapshot volumes in the volume family;
    having performed the snapshot delete processing, determining an amount of logical committed storage space recovered from the snapshot delete processing; and
    reducing the first count by an amount corresponding to the recovered logical committed storage space.

11. The method of claim 1 wherein the volume family has an associated family identifier (ID), the branch of the volume family has an associated branch ID, and each data volume in the volume family has an associated volume ID, wherein the family ID, the branch ID, and the volume ID for each data volume in the volume family are referred to herein collectively as an IO key, wherein the branch of the volume family includes a writable volume, and wherein the method further comprises:

receiving a write request at the first data storage appliance, the write request requesting that a data page be written to the writable volume of the volume family; incorporating the IO key into the write request; and forwarding the write request along a write path to effect writing of the data page to the writable volume of the volume family.

12. The method of claim 11 further comprising:

maintaining the IO key in a namespace index node (inode) of the first data storage appliance.

13. The method of claim 11 further comprising:

maintaining a mapping hierarchy of the sequence of data volumes, the mapping hierarchy including at least a volume level with a plurality of volume nodes corresponding to the sequence of data volumes, respectively, and a leaf level with a plurality of leaf nodes corresponding to a plurality of leaf pages, respectively, each leaf page pointing to a data page of a respective one of the sequence of data volumes.

14. The method of claim 13 wherein each leaf page has an attribute specifying an owner volume ID of an owner of the data page pointed to by the leaf page, and wherein the method further comprises:

having written the data page to the writable volume, setting an owner volume ID in a leaf page of the mapping hierarchy pointing to the data page to a current latest volume ID of the writable volume.

15. The method of claim 14 further comprising:

creating a snapshot volume from among the plurality of snapshot volumes in the branch of the volume family based on the writable volume;

assigning the current latest volume ID to the snapshot volume; and assigning a new latest volume ID to the writable volume.

16. The method of claim 15 further comprising:

having created the snapshot volume in the branch of the volume family, setting the owner volume ID in the leaf page of the mapping hierarchy pointing to the data page to the new latest volume ID of the writable volume.

17. A data storage appliance configured to perform space accounting for volume families, comprising:

at least one storage device configured to store a plurality of data volumes of a volume family;

a memory configured to store executable instructions; and storage processing circuitry configured to execute the executable instructions out of the memory:

to maintain a first count representing a first amount of physical storage space allocated to the plurality of data volumes in the volume family based on a number of data pages written to the respective data volumes in the volume family;

to maintain a second count representing a second amount of physical storage space allocated to the plurality of data volumes in the volume family, the second amount of physical storage space corresponding to an amount of physical storage space owned by the volume family, the plurality of data volumes in the volume family including a parent volume and a plurality of snapshot volumes that are sequential point-in-time (PIT) copies of the parent volume, and the volume family having a branch that includes the parent volume and a sequence of the sequential PIT copies;

to maintain, for each snapshot volume in the branch of the volume family, a third count for tracking a number of data pages written to the snapshot volume that were overwritten in an immediate next sequential PIT copy in the sequence, the third count representing a third amount of physical storage space allocated to the plurality of data volumes in the volume family, and the tracked number providing an indication of a number of data pages owned by the snapshot volume in the branch of the volume family; and based on one or more of the first amount of physical storage space, the second amount of physical storage space, and the third amount of physical storage space, to perform a migration of the plurality of data volumes in the volume family to a second data storage appliance, the first amount of physical storage space corresponding to an amount of physical storage space required to receive the volume family at the second data storage appliance, the second amount of physical storage space corresponding to an amount of physical storage space recovered having performed the migration of the volume family, and the third amount of physical storage space corresponding to an amount of physical storage space saved in the sequence of the sequential PIT copies included in the branch of the volume family.

18. The data storage appliance of claim 17 wherein the data pages include one or more deduplicated data pages, and wherein the storage processing circuitry is further configured to execute the executable instructions out of the memory to maintain a deduplication domain for each deduplicated data page written to the respective data volumes, the deduplication domain consisting of data segments within the volume family.

19. A computer program product including a set of non-transitory, computer-readable media having instructions that, when executed by control circuitry of a computerized apparatus, cause the control circuitry to perform a method of performing space accounting for volume families in a data storage system, the method comprising:

maintaining a first count representing a first amount of physical storage space allocated to a plurality of data volumes in a volume family based on a number of data pages written to the respective data volumes in the volume family, the plurality of data volumes being stored in association with a first data storage appliance;

maintaining a second count representing a second amount of physical storage space allocated to the plurality of data volumes in the volume family, the second amount of physical storage space corresponding to an amount of physical storage space owned by the volume family, the plurality of data volumes in the volume family including a parent volume and a plurality of snapshot volumes that are sequential point-in-time (PIT) copies of the parent volume, and the volume family having a branch that includes the parent volume and a sequence of the sequential PIT copies;

maintaining, for each snapshot volume in the branch of the volume family, a third count for tracking a number of data pages written to the snapshot volume that were overwritten in an immediate next sequential PIT copy in the sequence, the third count representing a third amount of physical storage space allocated to the plurality of data volumes in the volume family, and the tracked number providing an indication of a number of data pages owned by the snapshot volume in the branch of the volume family; and based on one or more of the first amount of physical storage space, the second amount of physical storage space, and the third amount of physical storage space, performing a migration of the plurality of data volumes in the volume family from the first data storage appliance to a second data storage appliance, the first amount of physical storage space corresponding to an amount of physical storage space required to receive the volume family at the second data storage appliance, the second amount of physical storage space corresponding to an amount of physical storage space recovered at the first data storage appliance having performed the migration of the volume family, and the third amount of physical storage space corresponding to an amount of physical storage space saved in the sequence of the sequential PIT copies included in the branch of the volume family.

20. The method of claim 1 further comprising:
obtaining a plurality of space accounting metrics for use in performing space accounting for the volume family, the obtaining of the plurality of space accounting metrics including obtaining two or more of (i) a Deduplication Ratio Metric from the first count and the second count, (ii) a Snapshot Savings Metric from the third count based on a logical size of the snapshot volume, (iii) a Physical Storage Space Recovered Upon Deletion of a Volume Family Metric from the second count, and (iv) a Physical Storage Space Required to Receive a Volume Family Metric from the first count.

* * * * *